(12) United States Patent
Breeden et al.

(10) Patent No.: US 7,685,258 B2
(45) Date of Patent: Mar. 23, 2010

(54) DISCONNECTIBLE APPLICATIONS

(75) Inventors: Timothy Breeden, Boulder, CO (US);
Skip Sauls, Longmont, CO (US);
Christopher Jolley, Broomfield, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 933 days.

(21) Appl. No.: 11/133,527

(22) Filed: May 20, 2005

(65) Prior Publication Data

US 2006/0069704 A1    Mar. 30, 2006

Related U.S. Application Data

(60) Provisional application No. 60/573,776, filed on May 21, 2004.

(51) Int. Cl.
*G06F 15/16* (2006.01)
*G06F 17/30* (2006.01)
(52) U.S. Cl. ............... 709/219; 709/203; 709/217; 707/1; 707/8; 707/10
(58) Field of Classification Search ............. 709/203, 709/219, 250, 217; 717/1, 8, 10
See application file for complete search history.

(56) References Cited

U.S. PATENT DOCUMENTS

| 6,510,550 | B1 * | 1/2003 | Hightower et al. ......... 717/108 |
| 7,349,968 | B2 * | 3/2008 | Johnson ..................... 709/227 |
| 2002/0103881 | A1 * | 8/2002 | Granade et al. ............ 709/218 |
| 2003/0014684 | A1 * | 1/2003 | Kashyap ....................... 714/4 |
| 2003/0158947 | A1 * | 8/2003 | Bloch et al. ................ 709/227 |

OTHER PUBLICATIONS

Grosso, Java RMI, Oct. 2001, O'Reilly Media, Inc.*

* cited by examiner

*Primary Examiner*—Yemane Mesfin
*Assistant Examiner*—Carlos R Perez Toro
(74) *Attorney, Agent, or Firm*—Fliesler Meyer LLP (57) ABSTRACT

Embodiments provide mechanisms and methods for providing disconnectible applications capable of executing at least semi-autonomously, i.e., without needing constant contact with a server, on a client substantially independent of server connectivity. The ability of a disconnectible application to execute on a client substantially independent of server connectivity can enable enhanced flexibility in organizing applications to build data processing systems.

27 Claims, 4 Drawing Sheets

DISCONNECTIBLE APPLICATIONS

CLAIM OF PRIORITY

The present application claims the benefit of:

U.S. Provisional Patent Application No. 60/573,776 entitled SYSTEMS AND METHODS FOR PORTAL 9.0, by Skip Sauls et al., filed on May 21, 2004. the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to systems and method for organizing applications. More specifically, it relates to techniques for providing disconnectible applications that can be run on clients without a constant connection to a server.

BACKGROUND OF THE INVENTION

Since its inception in 1995, the Java™ programming language has become increasingly popular. (Java™ is a trademark of Sun Microsystems, Inc.) Java, which is an interpreted language, enabled the creation of applications which could be run on a wide variety of platforms. This ability to function across a variety of different client platforms, i.e., platform independence, and Java's relatively easy implementation of network applications has resulted in the use of Java, as well as other programming languages that provide platform independence, in endeavors as basic as personal web pages to endeavors as complex as large business-to-business enterprise systems.

However, since applications that are designed to provide functionality over networked systems are necessarily designed to rely upon frequent connectivity in order for the applications to function, such applications are often rendered useless when connectivity is unreliable. For example, many applications require frequent interactive transmission with a remote server. Such applications often wait for replies and confirmations for any transmissions before proceeding to a next step. Additionally, since such conventional applications cannot function without server/client connectivity, servers are often forced to devote resources to relatively unimportant responses to remote clients, without which the remote applications would be held up.

What is needed is an improved mechanism for managing server/client interaction.

DETAILED DESCRIPTION

In embodiments there are provided mechanisms and methods for providing disconnectible applications capable of executing at least semi-autonomously, i.e., without needing constant contact with a server, on a client substantially independent of server connectivity. A "disconnectible application" (DA) can be any type of application, including without limitation a Portal or a Portlet, or an application completely separate from portal constructs. The ability of a disconnectible application to execute on a client substantially independent of server connectivity can enable enhanced flexibility in organizing applications to build data processing systems.

In an embodiment, disconnectible application can comprise one or more "smart pages" that provide dynamic access to data stored locally on a client. Through messages exchanged with a server, the disconnectible application is able to update a local data store and trigger actions on the server. Messages can be sent and received asynchronously with respect to the disconnectible application, so that the disconnectible application is not forced to wait for a server response. Because user interface pages are generated dynamically on the client, embodiments of disconnectible applications can be used even when network connectivity is poor or unavailable.

A disconnectible application can appear to 'contain' other disconnectible applications. In the case of a disconnectible Portal, this means the disconnectible Portal could contain disconnectible Portlets. The Portal and any disconnectible Portlets it contains can then be run in either in a connected or a disconnected mode.

In an embodiment, disconnectible applications reside in a runtime environment on the client, which provides the applications with a high-level abstraction of the services available on the client and asynchronous communications services. A web browser may be used to interact with the runtime environment to access the application on the client. When connected, a disconnectible application Portal can be enabled to access traditional (non-disconnectible) Portlets.

In an embodiment, disconnectible applications comprise one or more "screens" that contain user interface information and "message handlers" that process messages received from the server or other entities. Each screen includes a definition comprising information on how data should be bound from the local data store and what actions should be taken for user actions. The message handlers contain information on how to process messages arriving from the server or other entities, such as adding data from the message to the local data store or responding with another message.

The local data store is accessed by the disconnectible application as a hierarchical, ordered object database abstracted in the form of an XML document. The data store is not necessarily physically stored as an XML document, but treating it as such provides a familiar, powerful and flexible mechanism for storing data while maintai ing a relatively lightweight footprint. The disconnectible application runtime environment provides this abstraction on top of the actual data storage mechanism available on a client.

Disconnectible application embodiments can comprise a messaging interface for communicating with one or more servers, for example, and data access/persistence functionality on the client. In an embodiment, disconnectible applications communicate with one or more servers through an asynchronous message system. In an embodiment, disconnectible applications may reside within the runtime environment that abstracts messaging and data access functions from the applications thereby providing the applications with the flexibility to execute without constant connections to messaging and data access functions. The disconnectible applications may return or modify data stored on the client in response to messages received from the server responsive to communications with the server becoming active.

In an embodiment, communication to and from the disconnectible application is conducted through a "message" abstraction. Each message comprises of an "action", which serves as a label to indicate the message type or intent, and optionally some "action data", which may contain arbitrary data. Action data may be a hierarchical, ordered object database fragment and is accessible to the disconnectible application through an XML document fragment abstraction, although the data is not necessarily physically transmitted as XML. Data arriving from a server or other entities (such as other disconnectible applications or connected applications) can be presented to the appropriate message handler as an XML fragment. When the disconnectible application sends a message to the server or another entity, the disconnectible application can construct or derive an XML fragment representing the message and specify that the message be sent. The runtime environment is responsible for handling the underlying processing involved in receiving and sending messages, such as data formatting, network or inter-application protocols and error handling.

Disconnectible application creation can be performed by building on the supporting runtime framework, which provides mechanisms for accomplishing tasks to the disconnectible application.

Figure 1:
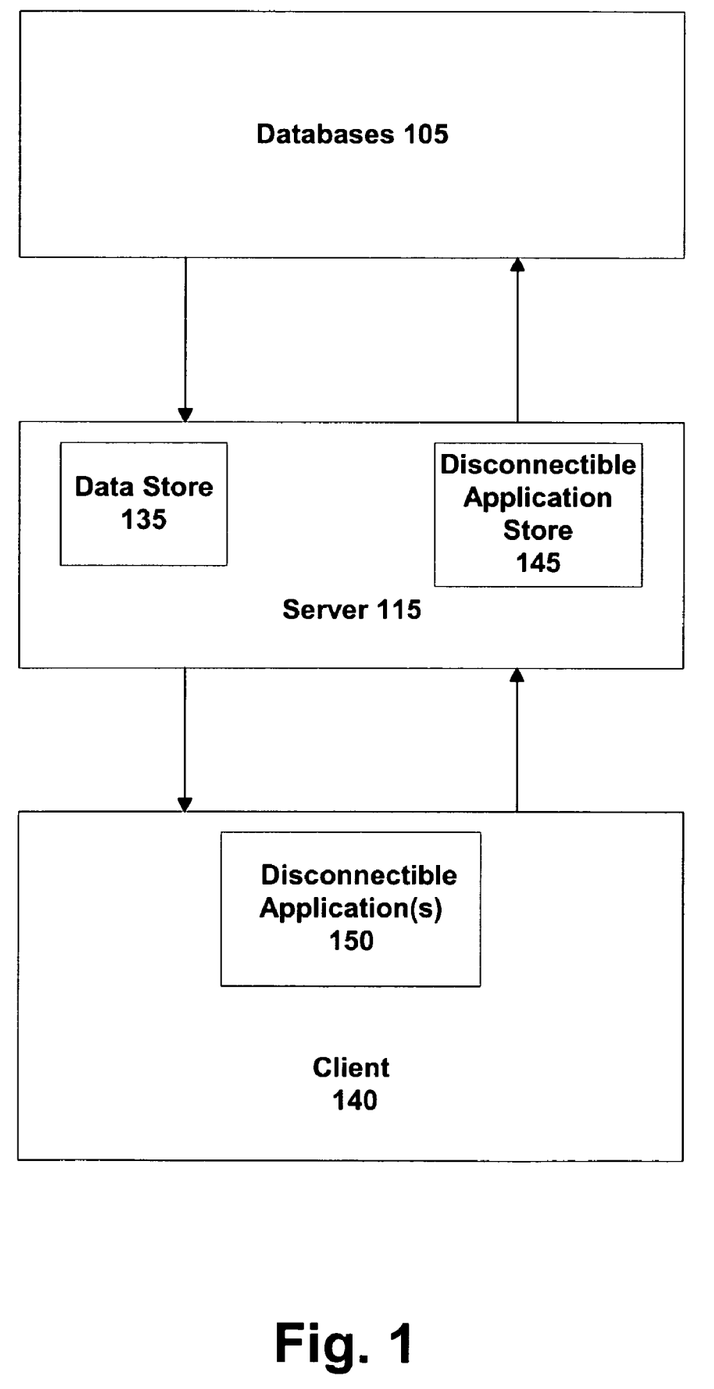
FIG. 1 is an overview of example interactions between a server, database, and client in an embodiment.

FIG. 1 is an overview of example interactions between a server, database, and client in an embodiment. A server 115 manages access between one or more databases 105 and one or more clients 140. The server 115 may run Java or other programming language environment configured to provide access to resources internal to the server, as well as resources reachable by the server 115, such as the databases 105. Embodiments of server 115 can be configured from a variety of hardware and software products. In one embodiment, the server utilizes WebLogic® Server from BEA systems of San Jose, Calif. The server 115 may include an internal data store 135 to store data for use by the server 115 in its interaction with the client 140. In some embodiments, the server 115 may include a disconnectible application store 145. The disconnectible application store 145 stores disconnectible applications that can be transmitted from the server to the client to be run on the client 140. In alternate embodiments, the disconnected applications do not originate on the server and are provided directly to the clients.

The databases 105 are information resources that are accessed and utilized by the server 115. In one embodiment, the databases 105 are Structured Query Language (SQL) compliant databases. The server 115 receives requests for data from the client 140, translates the data requests to SQL requests to be applied to the databases 105, and then passes the requested data back to the client 140.

The client 140 provides client functionality to include receiving input and data from users, transmitting the input and data to server 115, receiving responses and output from the server 115, displaying responses and output to a user and other client operations. As used herein, the term "user" is intended to include human users, as well as proxies and other computational entities. As with the server 115, the client 140 can be implemented by various combinations of hardware and software in various embodiments. The client 140 includes one or more disconnectible applications 150 deployed thereon. The disconnectible applications 150 are applications configured to run semi-autonomously without constant contact with the server 115. Embodiments of disconnectible applications 150 can employ an asynchronous message system to communicate with the server 115. In an embodiment, disconnectible applications 150 function within a runtime environment on the client 140 that abstracts messaging and data access functions from the various disconnected applications. The disconnectible applications 150 return or modify data stored on the client 140 in response to messages received from the server and interpreted through the runtime environment. In some embodiments, the disconnectible applications 150 are downloaded from the server 115 when the client 140 first interacts with the server 115, and/or at convenient times thereafter. In alternate embodiments, the disconnectible applications 150 are configured directly on the client 140, or may be obtained through a third party.

Figure 2:
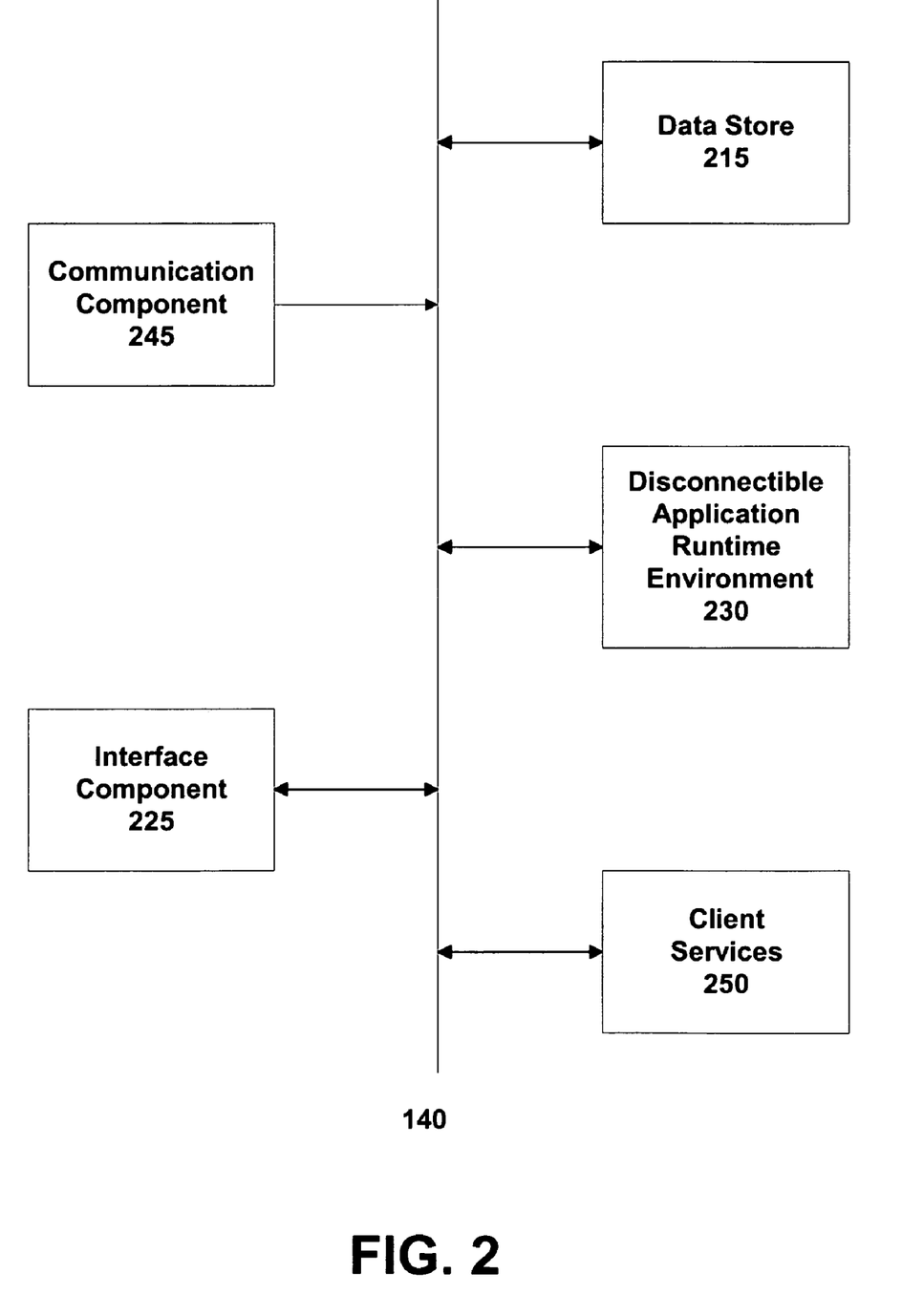
FIG. 2 is a functional overview of a client in an embodiment.

FIG. 2 is a functional overview of a client in an embodiment. As shown in FIG. 2, the client 140 includes a communications component, a data store 215, a disconnected application runtime environment 230, an interface component 225, and client services 250. While these functions are separated for illustrative purposes, they may be performed by the same or overlapping modules within the client 140.

The disconnectible application runtime environment 230 supports one or more disconnectible applications and provides messaging and data access support for the disconnectible applications. The disconnectible application runtime environment 230 maintains a messaging layer that receives messages from message handlers within the disconnectible applications, queues the messages until the server 115 is accessible, and transmits the messages to the server 115. The runtime environment 230 similarly receives messages from the server 115 and transmits them to the disconnectible applications. The disconnectible application runtime environment 230 additionally provides an interface to data store 215 in order to manage features such as data formatting, error handling, and management of data storage on behalf of the disconnectible applications.

The communication component 245 interfaces with the disconnectible application runtime environment 230 to manage the interaction between the client 140, and the server 115 and any other clients or servers with which the client 140 might interact. The communication component 245 additionally handles message management features such as data formatting, error handling, and management of network or inter-application protocols.

The client 140 additionally includes an interface component 225. The interface component is configured to receive input from a user of the client and to display output to the user. In some embodiments, the interface component 225 interacts with a web browser (not shown for brevity). In these embodiments, the interface component 225 collects input from the user through forms or other input mechanisms managed through the web browser. In these embodiments, the interface component 225 displays output to the user through content displayed on web pages viewed through the browser. In alternate embodiments, the interface component 225 generates a custom interface through which a user interacts with the client 140.

The client 140 additionally includes a data store 215. The data store 215 stores data to be accessed by the client services 250 and the disconnectible application runtime environment 230. The client services 250 are client data access and management services that are made accessible for the disconnectible applications.

Figure 3:
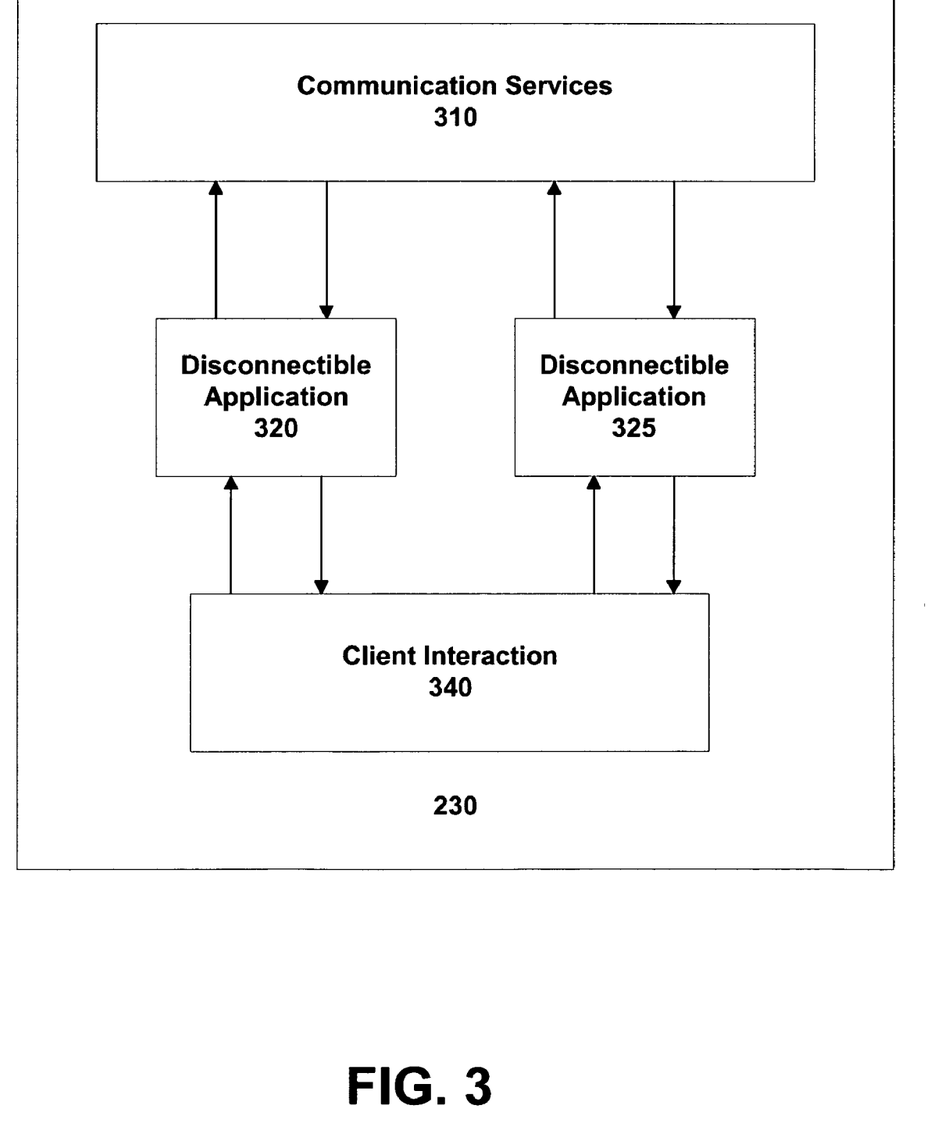
FIG. 3 is a block diagram illustrating another view of a disconnectible runtime environment residing within a client system in an embodiment.

FIG. 3 is a block diagram illustrating a closer view of a disconnectible application runtime environment residing within a client in an embodiment. As shown in FIG. 3, disconnectible application runtime environment 230 includes communication services 310, two disconnectible applications 320, 325 and a client interaction module 340. While only two disconnectible applications are illustrated, in various embodiments, the disconnectible application runtime environment 230 can include any number of disconnectible applications.

The disconnectible applications 320, 325 include interface data that is handled by a web browser or other interface component to generate a user interface that is used to collect input from users and display output. The interface data includes information indicating how data should be bound from the data store 215 and what information should be taken in response to user actions received through the generated interfaces. The disconnectible applications 320, 325 additionally include message handlers that process messages received from the server 115 or other entities. The message handlers indicate what actions should be taken by the disconnectible application 320, 325 in response to a message from the server 115. The actions can include displaying output to a user, modifying data stored in the data store 215, providing a response message, or performing other functions.

The communications services 310 receive outgoing messages from the disconnectible applications 320, 325 as well as incoming messages from the server 115, and transmit the messages to the intended destination. In some embodiments, the messages are configured as an extensible Markup Language message. In alternate embodiments, other formats are used. In some embodiments, the messages include an action field indicating the message type or intent. The message can also include an action data fragment containing arbitrary data.

The disconnectible application runtime environment 230 additionally includes a client interaction module 340. The client interaction module 340 governs the interaction between the disconnectible applications 320, 325, the client services 250, and the data stores 215. The client interaction module 340 abstracts data stored in the data stores 215 so that the data appears to disconnectible applications 320, 325 as a hierarchical ordered database in the form of an XML file. Thus, all data extraction and modification requests submitted by the disconnectible applications 320, 325 are formatted for such a database.

Figure 4:
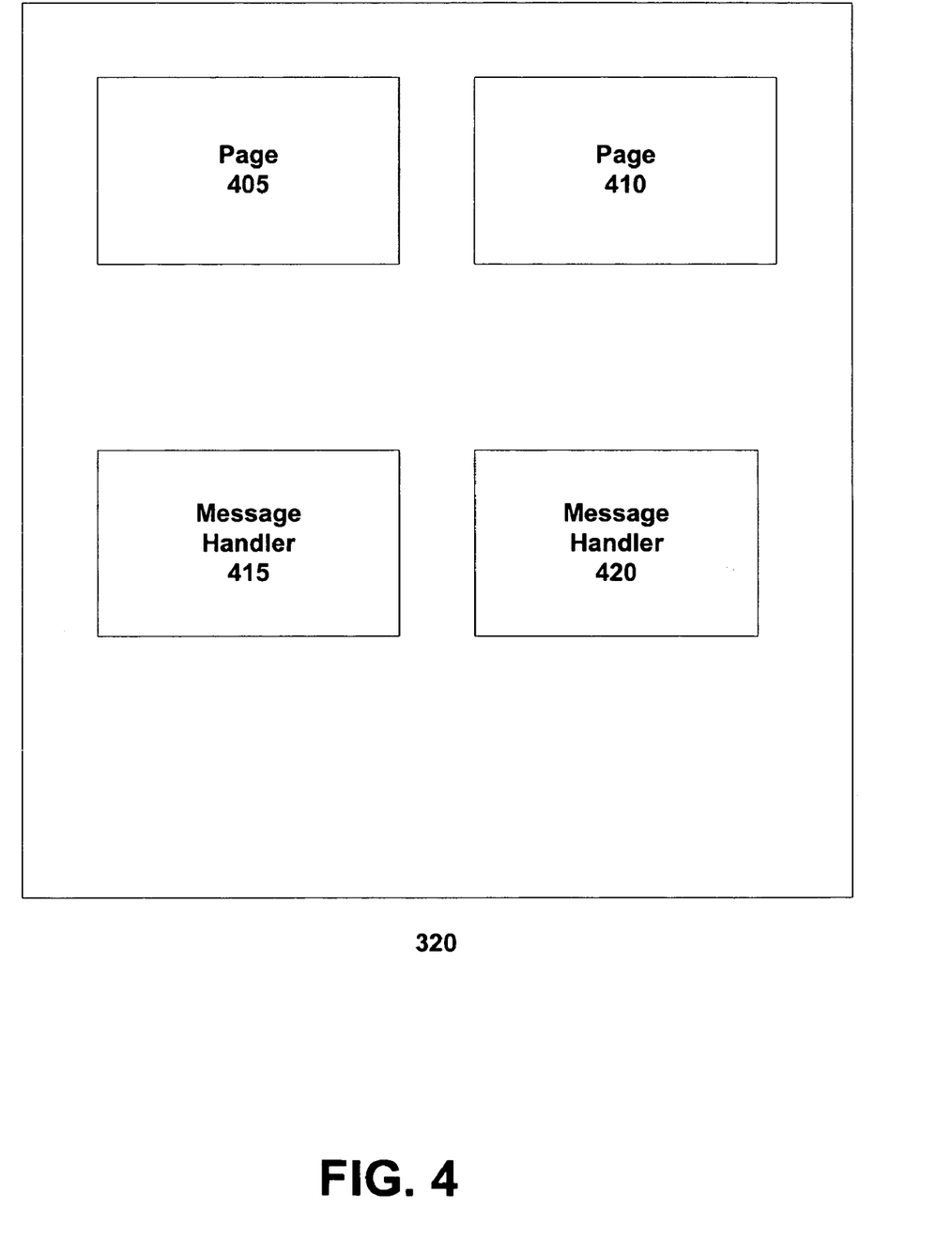
FIG. 4 is a block diagram of an example disconnected application in an embodiment.

FIG. 4 is a block diagram of the disconnected application in an embodiment. As shown in FIG. 4, disconnected application 320 includes pages 405, 410, and message handlers 415, 420. The pages store interface data that is processed by a web browser or other interface component to generate a user interface that is used to collect input from users and display output for a user of the disconnected application 315.

The pages 405, 410 include information indicating how user actions should be processed for each page's associated interface. These actions can include displaying or modifying data in the data store 215, or displaying a response to the user. While in the present embodiment only two pages 405, 410 are illustrated the disconnectible application 320 can have any number of pages.

The message handlers 415, 420 process messages received from the server 115 and respond accordingly. Potential responses include without limitation displaying output to a user, modifying data stored in the data store 215, providing a response message, or performing other functions. In some embodiments, a single message handler is configured to process all messages received from the server 215. In alternate embodiments, the disconnected application includes a different message handler for each message type or group of message types.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for operating an application on a client, the method comprising:
   deploying the application in a runtime environment on the client, wherein the application is configured to run in either a disconnected mode or a connected mode;
   providing, via the runtime environment, an interface to a data store and a messaging layer, wherein the data store manages data for the application, and a communication component of the messaging layer manages the interaction between the client and a remote server;

generating messages from the application, wherein when the application is in the connected mode messages are transmitted to and from the remote server; and wherein when the application is in the disconnected mode, the application operates on the client independent of server connectivity by accessing and transmitting data from and to the data store, by using communication services to transmit messages within the client to other applications on the client and by queuing messages to be sent to the remote server;

providing for a plurality of message handlers when the application in the disconnected mode for a plurality of message types, wherein the plurality of message handlers process messages received from the remote server and define a set of functions preformed in response to the messages;

queuing, via the runtime environment, messages being sent from the application operating in the disconnected mode to the remote server until server connectivity is established, and;

reestablishing interactions between the client and the remote server, wherein the step of reestablishing interactions includes transmitting the message to the remote server in a first message format including an action, wherein through the message exchanged with the remote server, the application is able to update the data store and trigger the action on the server, and modifying data stored on the client in response to the message received from the remote server responsive to communications with the remote server becoming connected with the client.

2. The method of claim 1, wherein the step of deploying the application in a runtime environment on the client comprises:
receiving the application from a server.

3. The method of claim 1, wherein the step of deploying the application in a runtime environment on the client comprises:
receiving the application from a source other than a server.

4. The method of claim 1, wherein the step of operating the application using the runtime environment so that the application executes without constant server connectivity comprises:
dynamically determining content to be displayed from information stored at the client.

5. The method of claim 1, wherein the step of operating the application using the runtime environment so that the application executes without constant server connectivity comprises:
dynamically determining how to process messages arriving at the client.

6. The method of claim 1, wherein the step of operating the application using the runtime environment so that the application executes without constant server connectivity comprises:
transmitting messages to a server in an asynchronous message transmission, wherein the asynchronous message transmission comprises transmitting the message independently of an associated server response.

7. The method of claim 1, wherein the application comprises at least one of: a portlet and a portal.

8. The method of claim 7, wherein the application enables the client to emulate functioning of the at least one of a portlet and a portal.

9. The method of claim 1, wherein the application comprises a portal, the portal operating a second application so that the second application executes without constant server connectivity.

10. A machine readable medium, having code for operating an application on a client stored thereon, that when executed by a processor is configured to cause a system to:
deploy the application in a runtime environment on the client, wherein the application is configured to run in either a disconnected mode or a connected mode;
provide, via the runtime environment, an interface to a data store and a messaging layer, wherein the data store manages data for the application, and a communication component of the messaging layer manages the interaction between the client and a remote server;
generate messages from the application, wherein when the application is in the connected mode messages are transmitted to and from the remote server; and wherein when the application is in the disconnected mode, the application operates on the client independent of server connectivity by accessing and transmitting data from and to the data store, by using communication services to transmit messages within the client to other applications on the client and by queuing messages to be sent to the remote server;
provide for a plurality of message handlers when the application in the disconnected mode for a plurality of message types, wherein the plurality of message handlers process messages received from the remote server and define a set of functions preformed in response to the messages;
queue, via the runtime environment, messages being sent from the application operating in the disconnected mode to the remote server until server connectivity is established, and;
reestablish interactions between the client and the remote server, wherein the step of reestablishing interactions includes
transmitting the message to the remote server in a first message format including an action, wherein through the message exchanged with the remote server, the application is able to update the data store and trigger the action on the server, and
modifying data stored on the client in response to the message received from the remote server responsive to communications with the remote server becoming connected with the client.

11. The machine readable medium of claim 10, wherein the step of deploy the application in a runtime environment on the client comprises:
receive the application from a server.

12. The machine readable medium of claim 10, wherein the step of deploy the application in a runtime environment on the client comprises:
receive the application from a source other than a server.

13. The machine readable medium of claim 10, wherein the step of operate the application using the runtime environment so that the application executes without constant server connectivity comprises:
dynamically determine content to be displayed from information stored at the client.

14. The machine readable medium of claim 10, wherein the step of operate the application using the runtime environment so that the application executes without constant server connectivity comprises:
dynamically determine how to process messages arriving at the client.

15. The machine readable medium of claim 10, wherein the step of operate the application using the runtime environment so that the application executes without constant server connectivity comprises:

transmit messages to a server in an asynchronous message transmission, wherein the asynchronous message transmission comprises transmitting the message independently of an associated server response.

16. The machine readable medium of claim 10, wherein the application comprises at least one of: a portlet and a portal.

17. The machine readable medium of claim 16, wherein the application enables the client to emulate functioning of the at least one of a portlet and a portal.

18. The machine readable medium of claim 10, wherein the application comprises a portal, the portal operating a second application so that the second application executes without constant server connectivity.

19. A client apparatus, comprising:

a processor;

a computer readable storage medium having instructions stored thereon, that when executed by the processor causes the processor to:

deploy the application in a runtime environment on the client, wherein the application is configured to run in either a disconnected mode or a connected mode;

provide, via the runtime environment, an interface to a data store and a messaging layer, wherein the data store manages data for the application, and a communication component of the messaging layer manages the interaction between the client and a remote server;

generate messages from the application, wherein when the application is in the connected mode messages are transmitted to and from the remote server; and wherein when the application is in the disconnected mode, the application operates on the client independent of server connectivity by accessing and transmitting data from and to the data store, by using communication services to transmit messages within the client to other applications on the client and by queuing messages to be sent to the remote server;

provide for a plurality of message handlers when the application in the disconnected mode for a plurality of message types, wherein the plurality of message handlers process messages received from the remote server and define a set of functions performed in response to the messages;

queue, via the runtime environment, messages being sent from the application operating in the disconnected mode to the remote server until server connectivity is established, and;

reestablish interactions between the client and the remote server, wherein the step of reestablishing interactions includes transmitting the message to the remote server in a first message format including an action, wherein through the message exchanged with the remote server, the application is able to update the data store and trigger the action on the server, and modifying data stored on the client in response to the message received from the remote server responsive to communications with the remote server becoming connected with the client.

20. The method of claim 1, further comprising receiving a server transmission from the server, the server transmission transmitted independently of an associated client response.

21. The method of claim 1, wherein the server transmission includes a server message having an associated action.

22. The method of claim 20, further comprising modifying a local data store in response to the server transmission.

23. The method of claim 1, wherein the message comprises an eXtensible Markup Language (XML) fragment.

24. The method of claim 1, wherein the message includes an associated action.

25. The method of claim 1, wherein the application includes a user interface that allows user interaction with the application regardless of server connectivity.

26. The method of claim 1, further comprising:

providing, via the runtime environment, an abstraction of data stored in a local data store to the application so that the data stored in the local data store appears to the application as a hierarchical ordered database regardless of the local data store's actual data storage mechanism.

27. The method of claim 1, wherein the set of functions performed in response to the messages include displaying output to a user, modifying data stored in the data store or providing a response message.

* * * * *

UNITED STATES PATENT AND TRADEMARK OFFICE
CERTIFICATE OF CORRECTION

| | | |
|---|---|---|
| PATENT NO. | : 7,685,258 B2 | Page 1 of 1 |
| APPLICATION NO. | : 11/133527 | |
| DATED | : March 23, 2010 | |
| INVENTOR(S) | : Timothy Breeden et al. | |

It is certified that error appears in the above-identified patent and that said Letters Patent is hereby corrected as shown below:

In column 5, line 33, delete "extensible" and insert -- eXtensible --, therefor.

In column 7, line 18, in Claim 1, delete "preformed" and insert -- performed --, therefor.

In column 8, line 30, in Claim 10, delete "preformed" and insert -- performed --, therefor.

Signed and Sealed this
First Day of March, 2011

David J. Kappos
*Director of the United States Patent and Trademark Office*